Patented July 10, 1945

2,379,974

UNITED STATES PATENT OFFICE 2,379,974

CELLULOSIC LACQUER

Julius G. Little, Wilmington, Del., assignor to Hercules Powder Company, Wilmington, Del., a corporation of Delaware No Drawing. Application May 1, 1943, Serial No. 485,367

15 Claims. (Cl. 106—173)

This invention relates to flexible lacquers suitable for protective and decorative coatings and more particularly it relates to such lacquers based on higher polyalkylene glycol-hydrogenated rosin acid esters.

Flexible lacquers heretofore have had insufficient gloss to be entirely satisfactory. Gloss is usually attained in lacquers by the incorporation of relatively large quantities of more or less hard resins. However, the gloss is obtained with a serious loss of flexibility. In addition, glossy lacquers have not retained even their limited flexibility at low temperatures or on prolonged exposure to the elements.

In accordance with this invention, new valuable lacquers having desirable gloss and flexibility characteristics are obtained by incorporation in certain proportions of an ester of a hydrogenated rosin acid and a polyalkylene glycol having at least three alkylene groups connected by ether linkages with a cellulose derivative such as nitrocellulose, ethyl cellulose, and the like, or other polymeric lacquer base capable of forming self-supporting free films, which is compatible with the polyalkylene glycol-hydrogenated rosin ester used. The polyalkylene glycol esters are not film forming (capable of forming self-supporting free films) by themselves, being viscous fluid or semi-fluid substances. However, when combined with compatible film forming lacquer bases, in proportions of between about 5 parts and about 80 parts of the film forming lacquer base for each 10 parts of the polyalkylene glycol-hydrogenated rosin acid ester, strong flexible films useful for protective and decorative purposes are obtained. Usually the ingredients mentioned are combined and utilized as coating compositions in solution in inert volatile solvents.

The ester of the hydrogenated rosin acid and the polyalkylene glycol is an ester of any hydrogenated rosin, such as derived by hydrogenation of wood rosin, gum rosin, isomerized rosin, heat-treated rosin, polymerized rosin, and the like or by hydrogenation of acids isolated from such rosins. The rosin or rosin acid may be hydrogenated before or following esterification with the polyalkylene glycol. It will be understood that the term "rosin acid" refers to either a relatively pure acid isolated from a rosin before or after hydrogenation or an unfractionated rosin.

The hydrogenated rosin acid may be esterified by any polyalkylene glycol having at least three alkylene groups connected by ether linkages. It will be understood that the alkylene group is to be considered herein as an alkane with two replaced hydrogens which may be, but need not be, upon adjoining carbon atoms. The resulting ester may be described by the following formula:

in which A is the radical of a hydrogenated rosin acid including the carboxyl oxygen atoms, in which $R_1$, $R_2$ and $R_3$ are alkylene groups which may be the same or different, and in which $x$ is an integer at least one and usually no more than seven. It will be understood that the grouping designated as $(R_2-O)_x$ is a series of alkylene groups represented by $R_2$ in which the alkylene groups may be the same or different. In general, the esters will for economic reasons be polyethylene glycol esters in which the number of ethylene groups is at least three and in which, in general, there will be no more than nine ethylene groups, for example, triethylene glycol, tetraethylene glycol, hexaethylene glycol, nonaethylene glycol-hydrogenated rosin esters and the like. However, any of the alkylene radicals such as those derived from propane, butane, pentane and hexane have been found suitable substitutes for the ethylene radical of the polyethylene glycol esters.

It has been found that the number of alkylene groups in the polyethylene glycol ester must be at least three, as a critical change in flexibility properties occurs between two and three groups when the ester is incorporated with a film former such as a cellulose derivative to form a lacquer film. When the ester has two alkylene groups in the chain, elongation and flexibility, especially flexibility at low temperatures, are insufficient for usefulness in flexible coatings. In fact, flexibility at low temperatures of the order of 28—32° F. is lacking altogether. At above two alkylene groups, flexibility and elongation increase rapidly. Films become flexible at low temperatures, such as 28 to 32° F., and the flexibility is found to be high after exposure to weathering. This effect is illustrated by the data given in Table I in which are given fold values of films representative of flexible lacquer films consisting of 50% nitrocellulose and 50% of ethylene glycol and polyethylene glycol esters of hydrogenated rosin. The fold values given are those obtained on the original dry film, those obtained after three hours of accelerated weathering (three hours fadeometer exposure) and those obtained at 32° F. after 24 hours conditioning at about 32° F. Elongation figures are also given.

In obtaining the data, a solution was made in each case consisting of 25 parts by weight of 15–20 seconds viscosity, 12% N-nitrocellulsoe, 25 parts by weight of the particular ester example in the table, 75 parts by weight of ethyl acetate and 75 parts by weight of butyl acetate. The resulting liquid coating composition was coated upon a glass plate to form a film about three mils thick after drying. This film was stripped from the glass plate, permitted to season for elimination of solvent, and tested to give the data indicated. Flexibility is given in terms of fold values by the Schopper Fold Tests method and is given as the number of folds to failure, the figures being average of at least ten tests.

TABLE I

*Flexibility properties of films of polyethylene glycol hydrogenation rosin esters and nitrocellulose*

| Ex. | Film with hydrogenated rosin ester of— | Original flexibility | Flexibility after 3 hrs. Fadeometer exposure | Flexibility at 32° F. | Film elongation, percent |
|---|---|---|---|---|---|
|  | Ethylene glycol | 12 | 0 | 0 | 2.7 |
|  | Diethylene gycol | 32 | 20 | 0 | 7 |
| I | Triethylene glycol | 58 | 50 | 1 | 11 |
| II | Tetraethylene glycol | 150 | 90 | 3 | 25 |
| III | Hexaethylene glycol | 250 | 250 | 15 | 24 |

Referring to Table I, it will be noted that the original flexibilities and elongation of ethylene and diethylene glycol esters of hydrogenated rosin lacquers are too low for highly flexible lacquers. It will be noted that they have no flexibility at all at 32° F. However, the flexibility and elongation increase markedly from the triethylene glycol ester up through the hexaethylene glycol ester. It will also be noted that the flexibility after exposure is very much greater for the higher esters and that they exhibit flexibility at 32° F., which property is entirely lacking in the mono- and diethylene ester lacquer.

The high flexibilities of the triethylene glycol and hexaethylene glycol-hydrogenated rosin acid esters continue in higher glycol esters. Thus, nonaethylene glycol-hydrogenated rosin esters, in films, made in the same way and in the same proportions as in Example III, give a film elongation of 49%, an original Schopper Fold value of about 1200 and a Schopper Fold value after three hours Fadeometer exposure of about 500. However, flexibility in the cold drops off and compatibility decreases.

The peculiar property of the higher polyalkylene glycol esters of hydrogenated rosin to impart high flexibility, which is retained upon aging and which is also manifested at low temperatures, to lacquer films, is not specific to lacquers made with nitrocellulose. Referring to Table II, which shows somewhat similar flexibility data for lacquer films containing ethyl cellulose with the triethylene and the hexaethylene glycol esters of hydrogenated rosin in comparison with data for similar lacquer films containing similar ethylene and diethylene glycol esters, it will be seen that the retained flexibility in the cold or upon exposure to the Fadeometer is zero or negligible in the case of the monoethylene and diethylene ester lacquers but is quite high in the case of the triethylene and hexaethylene glycol ester lacquers. The data given in Table II was obtained from films cast and seasoned in the manner described in connection with Table I. The coating compositions consisted in each case of 25 parts by weight of 22 seconds viscosity, 47.5% ethoxyl ethyl cellulose, 12.5 parts by weight of the particular glycol ester of hydrogenated rosin indicated, 90 parts by weight of toluene and toluene substitute and 22.5 parts by weight of ethyl alcohol.

TABLE II

*Flexibility properties of films of polyethylene glycol hydrogenation rosin esters and ethyl cellulose*

| Ex. | Film with hydrogenated rosin ester of— | Original flexibility | Flexibility after 3 hrs. Fadeometer exposure | Flexibility at 32° F. |
|---|---|---|---|---|
|  | Ethylene glycol | 56 | 0 | 0 |
|  | Diethylene glycol | 700 | 11 | 17 |
| IV | Triethylene glycol | 1,200 | 224 | 110 |
| V | Hexaethylene glycol | 2,200 | 1,100 | 600 |

Examples of coating compositions in accordance with this invention are given by the compositions indicated in Tables I and II as Examples I-V, it being understood that the ester and the nitrocellulose or ethyl cellulose in each case are dissolved in volatile solvents as hereinbefore mentioned for the formation of the lacquer films tested. The coating compositions so formed are suitable for dipping, casting, roller coating and the like applications. They become suitable for spraying upon dilution with sufficient solvent to reduce the viscosity to a spray gun level. The compositions of Examples IV and V may be applied substantially without solvents by application in the molten form. Additional examples of coating compositions in accordance with this invention are given in Table III in which coating compositions containing hard resins are illustrated.

TABLE III

| Ingredients | Example VI | Example VII |
|---|---|---|
| ½ sec. nitrocellulose | 10 | 13.8 |
| Hexaethylene glycol ester of hydrogenated rosin | 10 |  |
| Triethylene glycol ester of hydrogenated rosin |  | 9.0 |
| Glycerol maleic anhydride-rosin ester (Amberol 801) |  | 22.8 |
| Ethylene and triethylene mixed resinous ester of terpene-maleic anhydride condensate (Petrex 22) | 4 |  |
| Paraffin wax |  | 2.4 |
| Hydrocarbon toluene substitute |  | 50.0 |
| Butyl acetate | 27.25 | 16.6 |
| Butanol | 5.45 |  |
| Ethyl alcohol | 5.45 | 1.5 |
| Ethyl acetate | 16.35 | 16.6 |
| Toluene | 54.50 |  |

Example VI illustrates a lacquer giving a film of a very high gloss, great durability and resistance to temperature changes. Example VII illustrates a lacquer giving a finish which is moisture vapor proof and which is heat sealing. The film has a very high gloss for a wax-containing moisture vapor proof film.

It will be appreciated that the usual lacquer solvents such as ethyl acetate, butyl acetate, toluene, alcohol, butanol, xylol, methyl ethyl ketone, diethylene glycol monoethyl ether, ethylene dichloride, nitromethane, nitroethane and the like may be utilized. The exact solvent composition will depend on the rate of evaporation desired and the particular ingredients of the coating composition. Where the ingredients of the composition all are capable of subjection to relatively high temperatures without decomposition, volatile solvents may be omitted altogether and the composition applied in the molten state. Ethyl cellulose and benzyl cellulose are suitable film forming ingredients for such application.

The coating compositions may include pigments, fillers, soluble dyes, and the like. They may also include waxy materials, such as paraffin, stearic acid, Japan wax, montan wax and the like to impart moisture vapor proofness. As shown by the examples, resins may be incorporated where a relatively hard film is desired. Other resins, such as ester gum, hydrogenated ester gum, oil-modified or rosin-modified glycerol phthalate resins and the like may be incorporated. It will be appreciated that such resins tend to detract from the flexibility of the film. In general, they are useful to increase hardness, and in general, they are not required for gloss since the higher polyalkylene glycol-hydrogenated rosin esters, altogether fluid or semi-fluid in nature, impart gloss to the coating composition. Plasticizing agents such as tributyl phosphate, tricresyl phosphate, castor oil, alkyl phthalyl glycolates, acetyl triethyl citrate, butyl stearate, hydrogenated methyl abietate and the like may be incorporated in the coating compositions, if desired. In general, they will be used in relatively small quantity, if used at all, since the polyalkylene glycol-hydrogenated rosin esters do not require plasticization.

The film forming lacquer ingredient of the coating composition is preferably nitrocellulose or ethyl cellulose, as illustrated by the examples. The nitrocellulose or ethyl cellulose will be of the types soluble in organic solvents, for example, butyl acetate, acetone, toluene, carbon tetrachloride or any one of the solvents mentioned diluted with 20% of its weight by alcohol. It will be understood that in referring to a material as "organo-soluble," the material will be freely soluble in one or more of the solvents or solvent mixtures mentioned. Nitrocellulose having a nitrogen content of 10-12.6% is suitable. Ethyl cellulose having an ethoxyl content of 39-52% is similarly suitable. Other cellulose derivatives, for example, organo-soluble cellulose ethers such as benzyl cellulose, propyl cellulose, ethyl benzyl cellulose, or organo-soluble cellulose esters such as cellulose acetate propionate, acetate butyrate and the like have been found similarly suitable. However, it is essential that the cellulose derivative utilized be compatible with the particular hydrogenated rosin acid ester of the polyalkylene glycol utilized. By the term "compatible" as used herein, it will be understood that the two substances referred to will form a clear, homogeneous single phase mass upon being dissolved in a mutual volatile solvent and evaporating the solvent.

In addition to compatible cellulose derivatives, other polymeric organo-soluble materials which are capable of forming self-supporting free films and which are compatible with the polyalkylene glycol-hydrogenated rosin acid ester have been found to be improved thereby. Examples of such other polymeric organo-soluble materials are chlorinated rubber, chlorinated rubber hydrochloride, polyvinyl acetate-chloride, and polyvinyl butyral.

The cellulose derivative or other polymeric substance capable of forming a self-supporting free film is combined with the higher polyalkylene glycol rosin acid esters in certain proportions. For each 10 parts of the polyalkylene glycol ester by weight, there will be combined therewith between about 5 parts and about 80 parts by weight of the cellulose derivative or other polymeric material. In the case of nitrocellulose between about 5 and about 20 parts by weight will usually be used for each 10 parts of the polyalkylene glycol ester. In the case of ethyl cellulose, between about 5 parts and about 80 parts, preferably between about 10 and about 30 parts by weight of the ethyl cellulose, for each 10 parts of polyalkylene glycol ester will be incorporated with the latter.

The coating compositions in accordance with this invention are particularly suitable where protective and decorative finishes having a very high gloss are desired upon flexible surfaces. The gloss of the lacquer films is very high considering their flexibility. The coating compositions are especially useful for coating leather, paper, regenerated cellulose or other transparent sheeting, textiles and the like. The coating may be heavy and may be embossed to form an artificial leather. They are suitable for printing on textiles. However, they are also suitable for coating rigid surfaces, such as wood, for which purpose they will usually be formulated to form a relatively hard film. The resistance of the compositions to change in temperature makes wood lacquers particularly resistant to cold checking. The lacquer films obtained from the coating compositions retain their flexibility and gloss over temperatures ranging from 32° F. or lower to 200° F. and retain these properties on exposure to weather for long periods of time.

What I claim and desire to protect by Letters Patent is:

1. A coating composition comprising an ester of a hydrogenated rosin acid and a polyalkylene glycol having at least 3 alkylene groups connected by ether linkages, and for each 10 parts by weight of the ester, between about 5 parts and about 80 parts of an organo-soluble film-forming cellulose derivative compatible with the ester.

2. A coating composition comprising an ester of a hydrogenated rosin acid and a polyethylene glycol having no less than 3 and no more than 9 ethylene groups connected by ether linkages, and for each 10 parts by weight of the ester, between about 5 and about 80 parts of an organo-soluble film-forming cellulose derivative compatible with the ester.

3. A coating composition comprising an ester of a hydrogenated rosin acid and a polyalkylene glycol having at least 3 alkylene groups connected by ether linkages, and for each 10 parts by weight of the ester, between about 5 parts and about 80 parts of an organo-soluble polymeric material which is capable of forming a self-supporting free film and which is compatible with the ester.

4. A coating composition comprising an ester of a hydrogenated rosin acid and a polyethylene glycol having no less than 3 and no more than 9 ethylene groups connected by ether linkages, and for each 10 parts by weight of the ester, between about 5 and about 80 parts of an organo-soluble polymeric material which is capable of forming a self-supporting free film and compatible with the ester.

5. A coating composition comprising an ester of a hdyrogenated rosin acid and a polyalkylene glycol having at least 3 alkylene groups connected by ether linkages, and for each 10 parts by weight of the ester, between about 5 parts and about 80 parts of an organo-soluble cellulose ether compatible with the ester.

6. A coating composition comprising an ester of a hydrogenated rosin acid and a polyalkeylene glycol having at least 3 alkylene groups connected by ether linkages, and for each 10 parts by weight of the ester, between about 5 parts and about 80 parts of an organo-soluble cellulose ester compatible with the ester.

7. A coating composition comprising an ester of a hydrogenated rosin acid and a polyalkylene glycol having at least 3 alkylene groups connected by ether linkages, and for each 10 parts by weight of the ester, between about 5 parts and about 80 parts of nitrocellulose.

8. A coating composition comprising an ester of a hydrogenated rosin acid and a polyalkylene glycol having at least 3 alkylene groups connected by ether linkages, and for each 10 parts by weight of the ester, between about 5 parts and about 80 parts of ethyl cellulose.

9. A coating composition comprising an ester of a hydrogenated rosin acid and a polyalkylene glycol having at least 3 alkylene groups connected by ether linkages, and for each 10 parts by weight of the ester, between about 5 parts and about 80 parts of chlorinated rubber.

10. A coating composition comprising an ester of a hydrogenated rosin acid and hexaethylene glycol and between about 5 parts and about 80 parts by weight of an organo-soluble cellulose derivative compatible therewith for each 10 parts of the said ester.

11. A coating composition comprising an ester of a hydrogenated rosin acid and tetraethylene glycol and between about 5 parts and about 80 parts by weight of an organo-soluble cellulose derivative compatible therewith for each 10 parts of the said ester.

12. A coating composition comprising an ester of a hydrogenated rosin acid and triethylene glycol and between about 5 parts and about 80 parts by weight of an organo-soluble cellulose derivative compatible therewith for each 10 parts of the said ester.

13. A coating composition comprising an ester of a hydrogenated rosin acid and hexaethylene glycol and between about 5 parts and about 80 parts of nitrocellulose for each 10 parts of the acid ester and a volatile solvent for the ester and the nitrocellulose.

14. A coating composition comprising an ester of a hydrogenated rosin acid and tetraethylene glycol and between about 5 parts and about 80 parts of nitrocellulose for each 10 parts of the acid ester and a volatile solvent for the ester and the nitrocellulose.

15. A coating composition comprising an ester of a hydrogenated rosin acid and triethylene glycol and between about 5 parts and about 80 parts of nitrocellulose for each 10 parts of the acid ester and a volatile solvent for the ester and the nitrocellulose.

JULIUS G. LITTLE.